United States Patent [19]

Binkley

[11] 3,757,963
[45] Sept. 11, 1973

[54] MULTI-DIRECTIONAL INDEXING APPARATUS
[75] Inventor: Ralph N. Binkley, Yardley, Pa.
[73] Assignee: Western Electric Company, Incorporated, New York, N.Y.
[22] Filed: Apr. 6, 1971
[21] Appl. No.: 131,653

[52] U.S. Cl. ............. 214/1 BH, 74/99 R, 214/1 BC
[51] Int. Cl. ............................................. B66c 1/02
[58] Field of Search ...................... 214/1 BH, 1 BC; 74/89, 99 R

[56] References Cited
UNITED STATES PATENTS
3,391,722   7/1968   Ligh.................................. 74/89 X
FOREIGN PATENTS OR APPLICATIONS
936,453   9/1963   Great Britain ................. 294/110 B Primary Examiner—Gerald M. Forlenza
Assistant Examiner—George F. Abraham
Attorney—W. M. Kain, R. P. Miller and A. C. Schwarz, Jr.

[57] ABSTRACT

A multi-directional indexing apparatus for transporting articles in succession to and for depositing and/or picking-up such articles at a plurality of circumferentially disposed work stations. The apparatus comprises a multi-finger index table, with each finger having a vacuum pick-up head associated therewith for carrying the articles, and a drive mechanism including a barrel cam having a peculiarly shaped orbital cam passageway formed therein and a reciprocally movable cam follower for driving the barrel cam and the index table indirectly coupled thereto. A reciprocal, linear stroke of the cam follower during each composite indexing period sequentially effects, through the resultant rotational movements of the barrel cam, very precise multi-directional rotation and vertical displacement of the index table.

23 Claims, 16 Drawing Figures

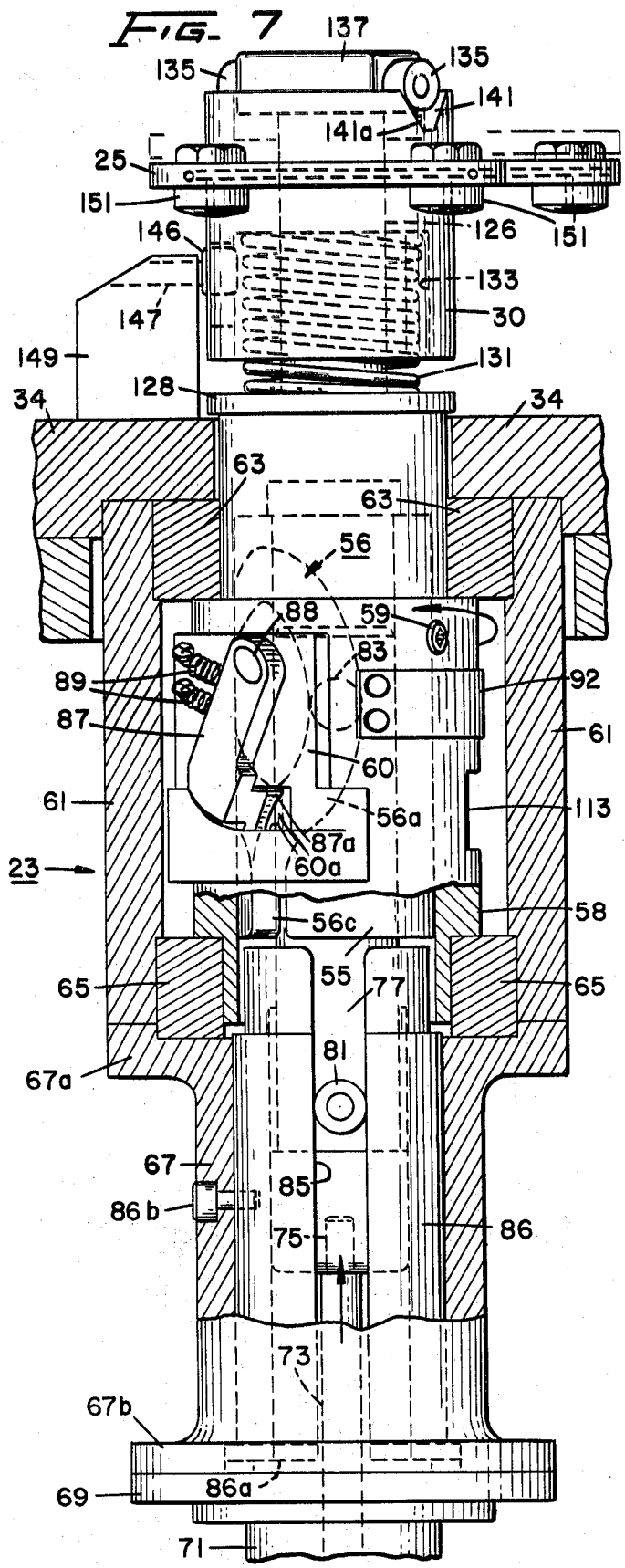
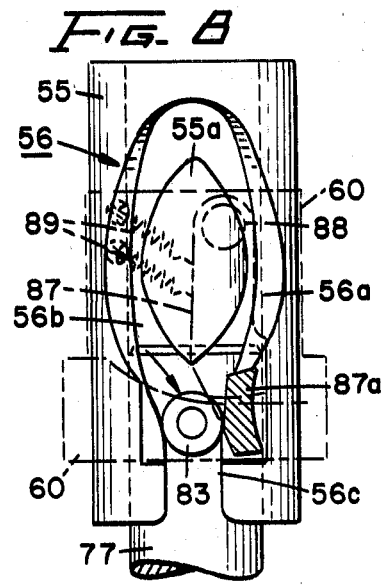
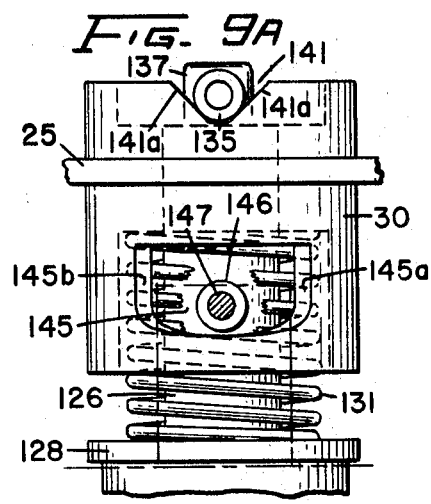
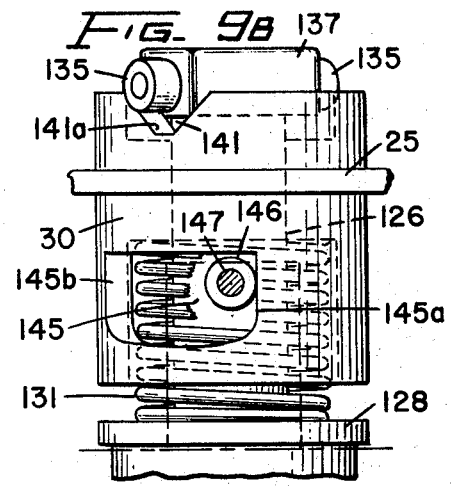

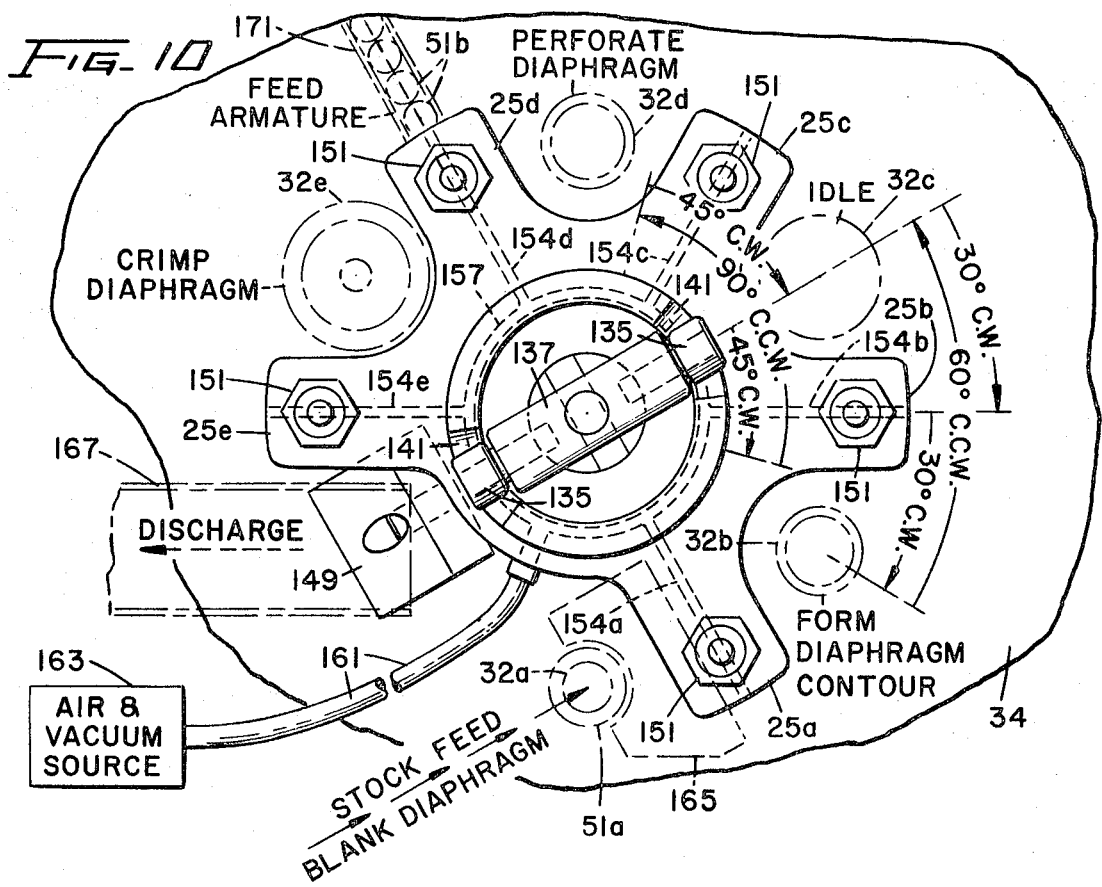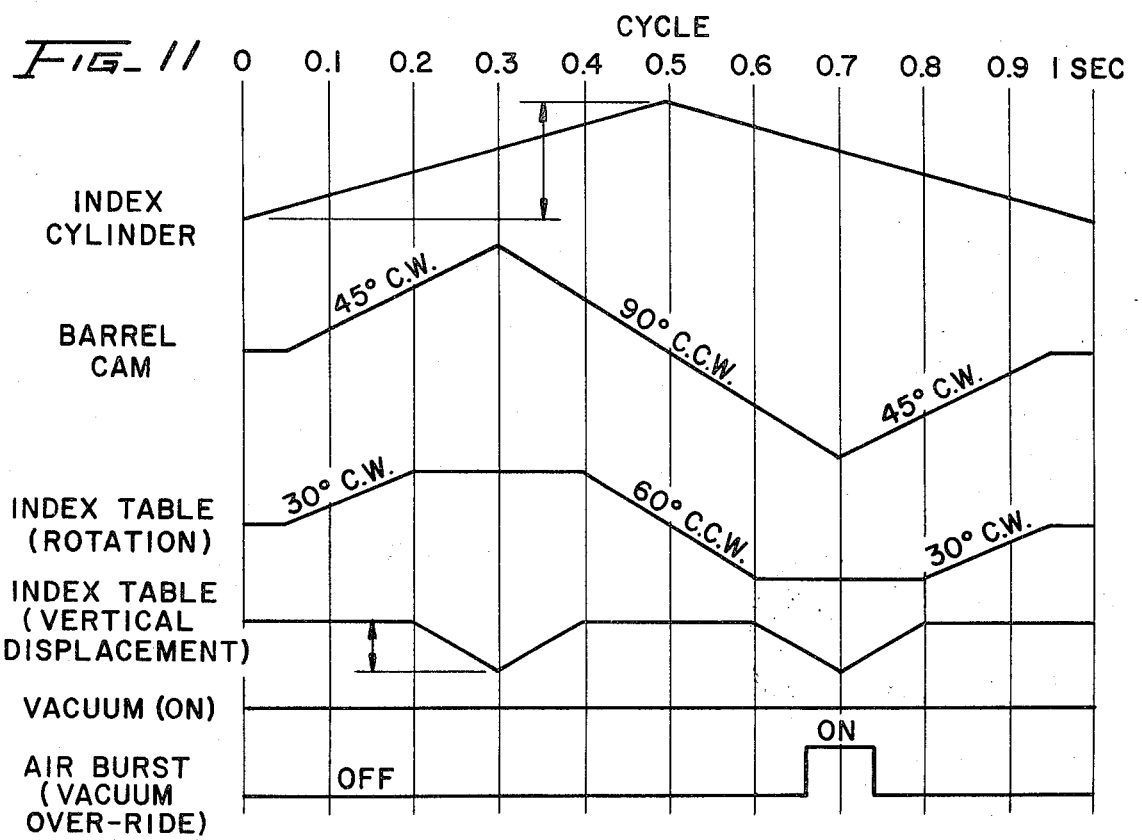

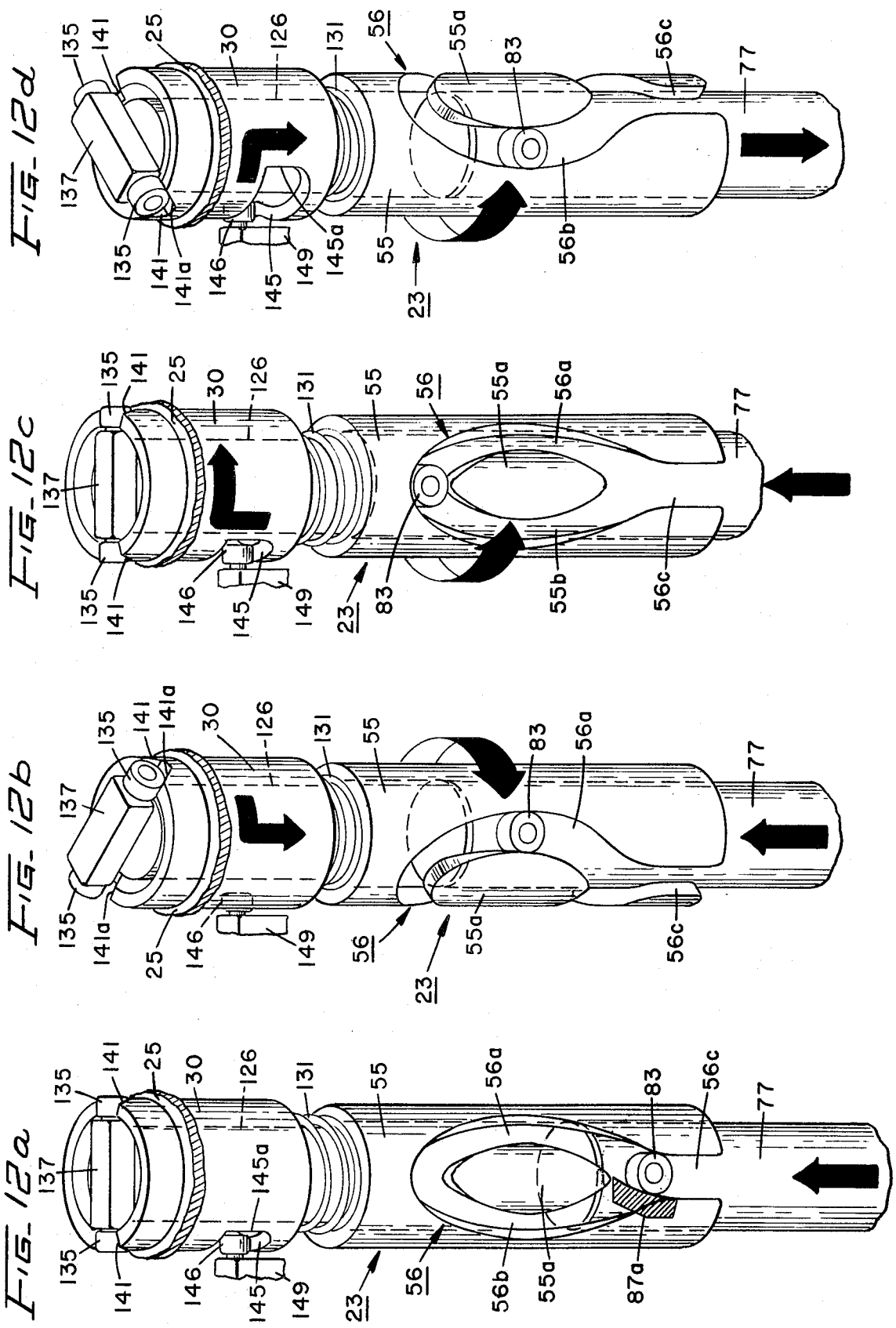

MULTI-DIRECTIONAL INDEXING APPARATUS

BACKGROUND OF THE INVENTION

1. Field of the Invention

This invention relates to indexing apparatus and, more particularly, to such apparatus wherein both multi-directional rotation and vertical displacement may be precisely and sequentially imparted to an index table.

2. Description of the Prior Art

In many manufacturing applications there is a need for a rotary index table or turret which is capable of rapidly and precisely indexing a plurality of circumferentially spaced work or article carrying fixtures thereon into alignment with one or more circumferentially spaced and adjacent stationary work or test station fixtures. Precise indexing is of utmost importance, of course, when small or miniaturized piece parts, articles, electrical components and the like are involved, and especially where a physical work function is to be performed directly thereon such as drilling, forming, part inserting, bonding, etc.

The speed of indexing from one position to the next is likewise of great importance in many applications, especially where there are a number of work stations associated with a given rotary index table and/or where the work to be performed encompasses a period of time considerably less than the normal period required to index the table from one position to the next. Work functions which often require but a fractional part of a second may involve: electrically testing a component, perforating, forming or blanking an article, or staking, welding or bonding one article to another, to mention but a few.

When work functions of the foregoing types are to be performed on articles (used herein in a broad generic sense to encompass piece parts, components, devices, etc.), and particularly when the articles are of a type conducive to vibratory feeding to a rotary index table, the speed of indexing of the table obviously has a great bearing on the efficiency of the work that can be performed on and the volume of product which can be handled by a given indexing apparatus in a given period of time.

Heretofore, most rotary indexing apparatuses have employed some form of directly coupled drive mechanism, such as the well-known Ferguson drive, to provide intermittent indexing of the table from one position to the next. The power source for such a drive is either intermittently operated or continuously operated in conjunction with an intermittently operated clutch mechanism.

While such directly coupled drives provide adequate indexing of a table in many applications, they have not proven to be a panacea for all applications, especially where large numbers of inexpensive and compact rotary indexing apparatuses are required for use in connection with high volume manufacture of miniaturized articles.

More specifically, directly coupled, uni-directional drives are quite expensive, especially when they must satisfy demanding operating requirements, such as effecting relatively rapid and precise indexing of rotary tables. Such drives are also generally quite heavy and bulky, even those designed for driving tables which are relatively small and of light weight, and wherein no appreciable works forces are imparted thereagainst.

Another disadvantage of conventional, positive drive mechanisms is that they are not readily adaptable to multi-directional rotational movement. Such movement would be very desirable, for example, in aplications where a large number of operating stations are employed. More specifically, through the use of oscillatory and partially overlapping indexing of a rotary index table, only two article carrying fixtures would have to be precisely aligned with an equal number of common stationary work fixtures, as distinguished from every article carrying fixture having to be accurately aligned with every stationary work fixture circumferentially spaced between the load and unload index positions associated with a given apparatus.

There is also a definite need for an indexing apparatus which not only is capable of imparting multi-directional movement to the table, but of imparting periodic vertical displacement thereto in a sequential manner. Such compound movement would be of particular advantage with an index table constructed in a multi-finger or spider configuration. Such a table, particularly with vacuum pick-up heads respectively secured to the fingers thereof, would allow articles to be picked up from or deposited on selectively aligned stationary work fixtures. Thereafter, the overlying article carrying fingers could be indexed to areas interposed between different adjacent ones of a plurality of stationary fixtures during each dwell period. This, of course, would allow retractable tooling disposed above the table to perform force-imparted work directly on the articles, with the table itself bearing none of the force. Concomitant advantages of this are that the indexing apparatus could then be built with less stringent requirements relating to its size, mass, structural rigidity, driving power and braking. All of these factors, of course, have a direct bearing on the cost, simplicity and maintenance requirements of a given indexing apparatus.

SUMMARY OF THE INVENTION

An object of the present invention is to provide a new and improved rotary indexing apparatus which obviates the need for both complex and expensive directly coupled drive mechanisms.

Another object of the present invention is to provide a new and improved indexing apparatus wherein multi-directional rotation is imparted to a driven index table thereof.

An additional object of the present invention is to provide a new and improved indexing apparatus wherein both multi-directional rotation and vertical displacement is sequentially imparted to a driven index table thereof, and wherein the table is rapidly decelerated upon approaching each index stop in such a manner as to obviate the need for an auxiliary braking mechanism.

It is still a further object of the present invention to produce sequentially both partially overlapping multi-directional rotation and vertical displacement of a multi-finger index table having vacuum pick-up heads associated with each finger, and wherein each finger is respectively restricted to sequential movement between and alignment with only three index positions associated with the table.

It is also an object of the present invention to provide a drive mechanism for rotary index tables which is light in weight, requires a minimum of space, is of simple and inexpensive construction, and wherein all of the main moving parts are readily accessible for routine maintenance and/or replacement.

In accordance with the principles of the present invention, a multi-directional indexing apparatus is constructed to transport articles in succession to a plurality of circumferentially disposed and respectively aligned work stations. The apparatus, in one preferred illustrative embodiment, comprises a multi-finger index table, with each finger having a vacuum pick-up head associated therewith, a barrel cam having a peculiarly shaped cam passageway (appearing oval-shaped in a two-dimensional view) formed therein, and a reciprocally movable cam follower for driving the barrel cam and the index table indirectly coupled thereto. A complete reciprocal stroke of the cam follower during each composite indexing period sequentially effects, through the resultant movements of the barrel cam, very precise multidirectional rotation and vertical displacement of the index table.

In accordance with one illustrative embodiment, three successive rotational movements of the barrel cam of 45° clockwise, 90° counterclockwise and 45° clockwise will, in turn, through an indirect, loss-motion coupling connection with the index table, produce three successive rotational movements of the latter of 30° clockwise, 60° counterclockwise and 30° clockwise.

By means of a spring-biased, cam-controlled mechanism, the table is vertically displaced downwardly whenever rotated to the two opposite extreme angular positions. While in either of these positions, each index table finger overlies and is aligned with a different stationary work fixture.

Such compound multi-rotational and vertical index table movement advantageously allows each vacuum pick-up head, for example, to be indexed 30° clockwise from a dwell position (whereat each finger is interposed between a different pair of adjacent stationary fixtures) so as to pick up an article from an aligned stationary fixture and then transfer it 60° counterclockwise to the other common and adjacent fixture, before being indexed 30° clockwise back to the dwell position. While the index table is in the dwell position, it becomes readily apparent that work or machining operations may be performed on the articles by tooling brought into contact therewith through the spaces defined between adjacent fingers. In this way no work imparting force is exerted on the index table itself.

The use of the unique barrel cam as a multidirectional drive mechanism for the index table also gives rise to the following advantages: minimizes the number of stationary and moving parts required, simplifies and reduces the cost of construction, requires a minimum amount of space beneath the table and obviates the need for expensive and complex braking mechanisms. Externally applied braking is not required because of both an inherent decreasing rate of rotational deceleration imparted to the index table by the barrel cam while approaching each index position, and because of a shock-absorbing type of loss-motion coupling connection between the barrel cam and index table. As a result, abrupt or jarring stops and/or starts of the table are avoided. This becomes a very important factor when the article carrying fixtures on the table comprise vacuum pick-up heads. Such heads, of course, sometimes provide the only effective means of rapidly picking-up, transferring and seating miniaturized articles, such as semi-conductor chips, thin film circuits, leads, terminals, eyelets, rivets, fasteners and the like.

BRIEF DESCRIPTION OF THE DRAWINGS

FIG. 7 is a front elevational view, partially in section, illustrating the main structural features of the drive mechanism and cam-controlled support structure for the multi-finger index table as embodied in accordance with the principles of the present invention, but distinguishing primarily from FIG. 2 by the position of the barrel cam, cam follower and index table;

FIG. 8 is a front elevational view primarily of the barrel cam portion of the drive mechanism as depicted in FIG. 5, but distinguishing therefrom by depicting the associated cam follower at the point at which it exits the passageway;

FIGS. 9A, 9B are partial, detail front elevational views, FIG. 9A taken along the line 9A—9A of FIG. 2, illustrating two different angular positions of the spring-biased cam-controlled support member associated with the indexing table, and the manner by which vertical displacement of the table is effected through the utilization of loss-motion between the barrel cam and the support member;

FIG. 10 is an enlarged plan view of the multi-finger indexing table, and further illustrates generally, in phantom, the stock feed and discharge stations and various work stations which are employed in one illustrative application in assembling diaphragm-armature units for telephone receivers of the type depicted in FIG. 6;

FIG. 11 is a timing chart depicting the direction of movement and the time duration thereof for various structural elements of the multi-directional indexing apparatus over a period of one second, which comprises the non-dwell half of a typical composite operating period, and FIGS. 12A–12D are partial, detail perspective views illustrating four different angular positions of the barrel cam and the associated spring-mounted table support member coupled thereto relative to the reciprocally driven cam follower, the figures depicting the relative positions of the aforementioned members at 0, 0.3, 0.7, and 1 second intervals of a typical operating cycle as indicated in the timing chart of FIG. 10.

DETAILED DESCRIPTION

Figure 1:
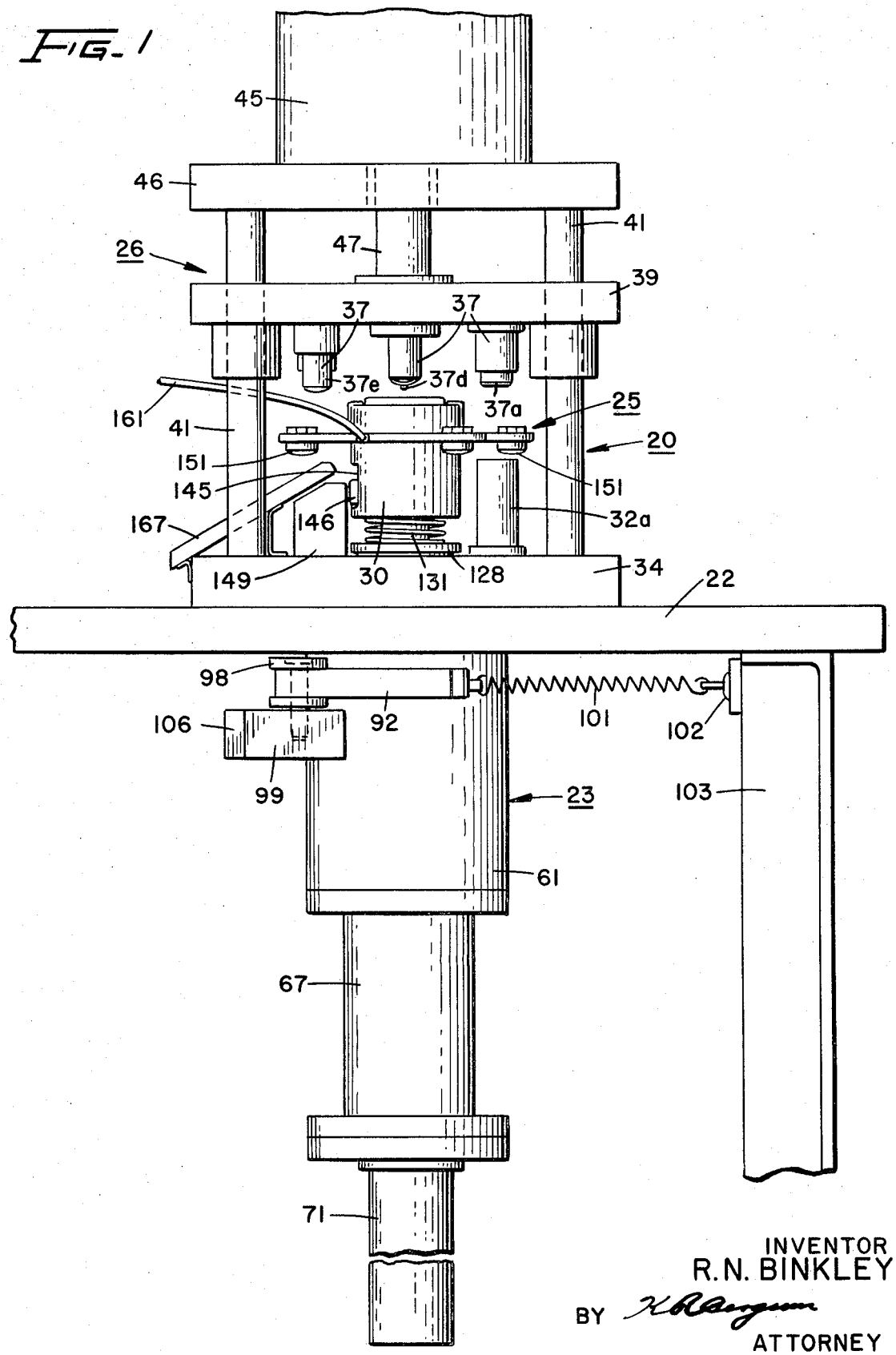
FIG. 1 is a front elevational view of a multidirectional indexing apparatus in accordance with a preferred embodiment of the invention.
Figure 2:
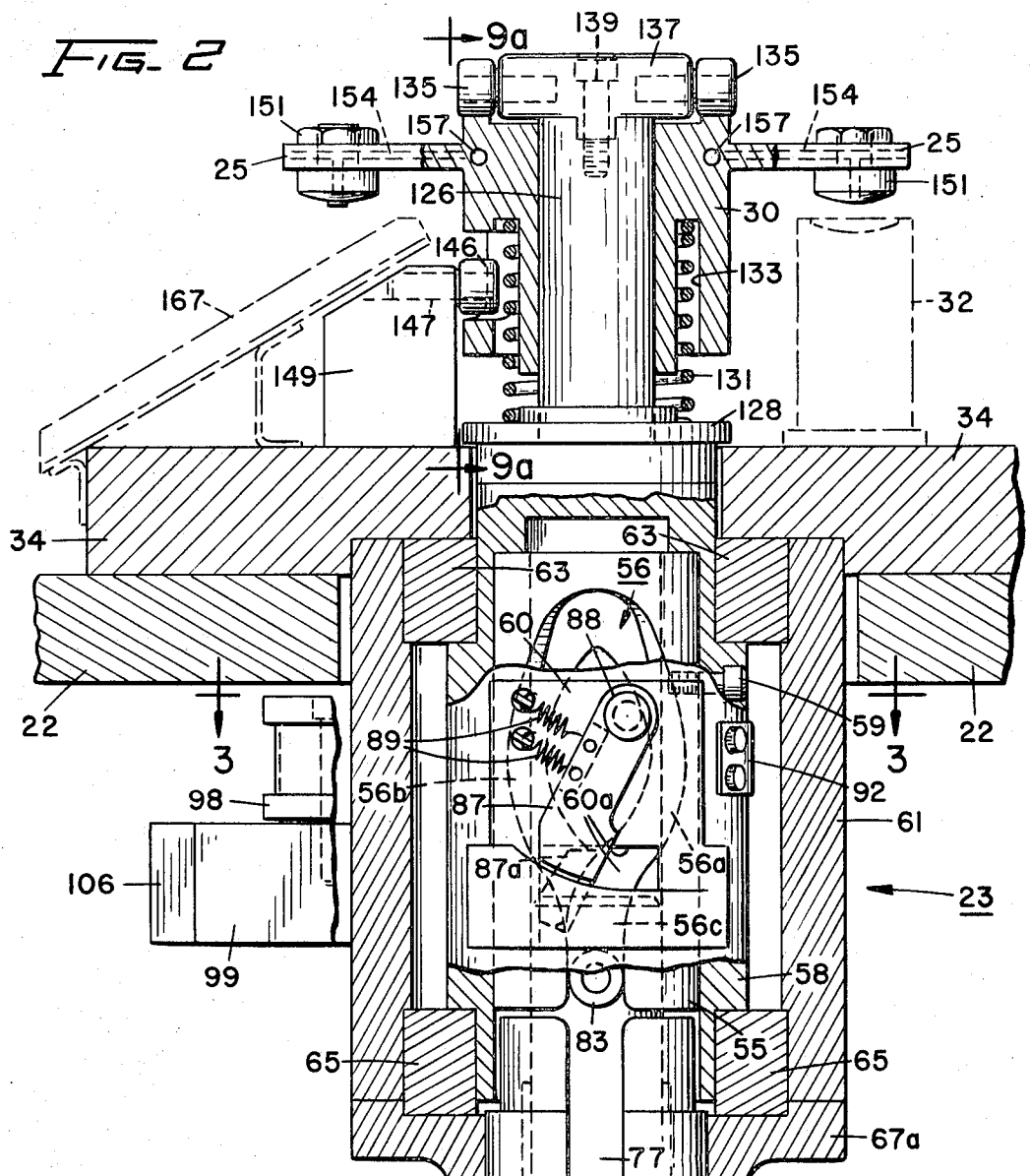
FIG. 2 is a front sectional view illustrating the main structural features of the drive mechanism and cam-controlled support structure for the multi-finger indexing table as embodied in accordance with the principles of the present invention.

In accordance with the principles of the present invention, and with specific reference to FIGS. 1 and 2, a multi-directional indexing apparatus, designated generally by the reference numeral 20, is mounted on a stationary support table 22. The apparatus includes a drive mechanism 23 supported by and positioned beneath the stationary table 22. Mechanism 23 indirectly supports and imparts selective multidirectional rotation to a multi-finger index table 25 (best seen in FIG. 10) positioned above the stationary table 22. The index table is mounted on a cylindrical spring-biased index support member 30 which is indirectly coupled to the drive mechanism.

A plurality of stationary work station support fixtures 32a–32f (see FIG. 10) are secured to an auxiliary support base 34 which, in turn, is secured to the stationary table 22. These stationary work fixtures are circumferentially spaced beneath and in close proximity to the underside of the index table 25. A plurality of work operating heads 37, normally disposed above the index table, are secured to a support plate 39 which, in turn, is mounted for slidable, reciprocal movement along four guide rods 41 positioned in space quadrature. As such, the operating heads may be periodically brought into work engaging relationship with articles transported by the index table to the respectively aligned stationary work fixtures 32. Vertical movement is imparted to the support plate 39, and thereby to the operating heads 37 (including tooling), through the actuation of a pneumatic cylinder 45, only partially shown in FIG. 1, which has a piston 47 connected to the movable support plate.

As the particular work functions performed at the various work stations are not of particular importance with respect to gaining an understanding of the novel features embodied in the present invention, they will only be briefly described hereinafter in connection with one illustrative manufacturing operation wherein a diaphragm-armature assembly 51 (FIG. 6), used in certain telephone receiver units, is formed and assembled.

Considering now in greater detail the multidirectional drive mechanism designated generally by the reference numeral 23 in FIG. 1, and best seen in FIGS. 2–8, a cylindrical barrel cam 55 having a peculiarly shaped orbital passageway 56 formed therein is secured by a plurality of suitable fasteners 59 (FIGS. 2 and 7) to an outer rotatable support sleeve 58. The orbital passageway 56 in a preferred embodiment comprises two mutually disposed arcuate sections 56a, 56b, with the corresponding ends thereof forming upper and lower communicating vertices. As the wall portion 55a of the barrel cam, defined within the continuous orbital passageway, is in actuality positioned in free-space relation with respect to the remainder of the barrel cam wall, the portion 55a is secured to a thin wall portion 58a of the support plate 58. (best seen in FIGS. 3 and 4). The wall portion 58a also has a flat outer surface on which a support plate 60 is secured by any suitable means.

The support sleeve 58 is mounted for rotational movement within an outer cylindrical and stationary housing 61 by means of a plurality of pairs of upper and lower roller bearings 63 and 65, respectively, which are confined in undercut grooves formed in mutually disposed surface areas of the rotatable support sleeve 58 and the outer housing 61. The housing is rigidly secured at its lower end to a mating upper flange 67a of a cylindrical shank 67. A lower flange 67b of the shank is secured to a mating flange 69 which, in turn, is secured to the outer housing of a pneumatic cylinder 71, preferably of the double acting type, illustrated in FIG. 1. The piston 73 of the pneumatic cylinder 71 is secured by a threaded member 75 (FIG. 2) to a cylindrical drive rod 77. Both pneumatic cylinders 45 and 71, of course, are supplied with air or fluid in a controlled, sequential manner from sources and associated programmed, valve-actuated apparatus of conventional design.

Figure 5:
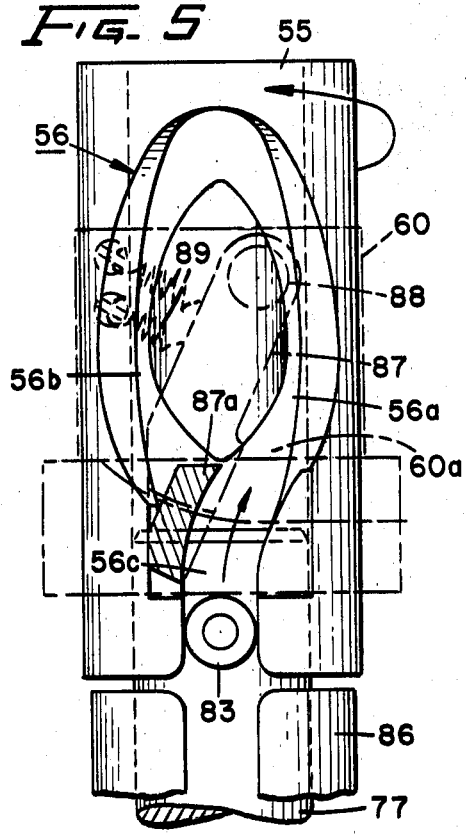
FIG. 5 is a front elevational view primarily of the barrel cam portion of the drive mechanism taken along the line 5—5 of FIG. 4, and illustrating in greater detail the peculiar oval-shaped contour of the cam passageway formed therein and the position of the associated cam follower upon entering the passageway.
Figure 4:
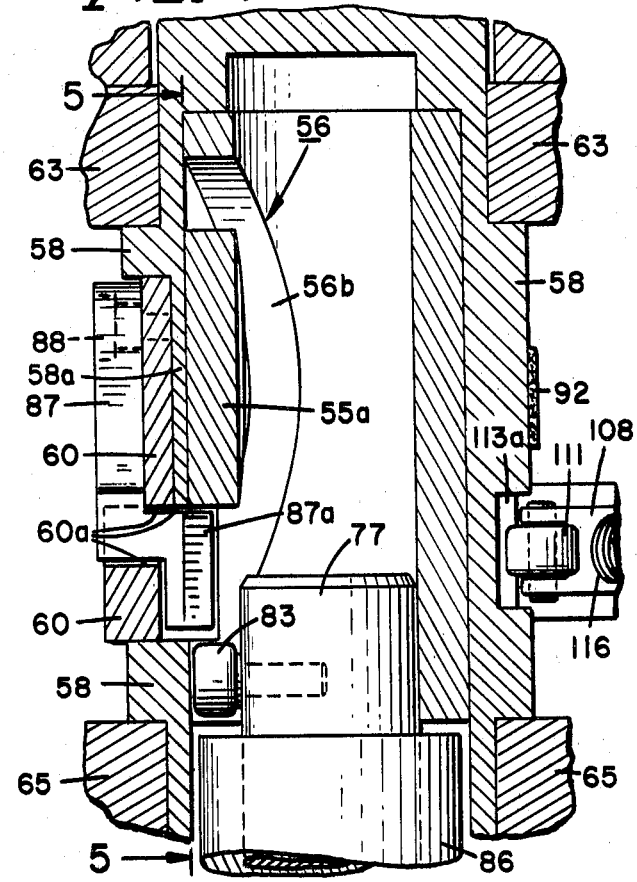
FIG. 4 is a sectional side elevational view of a major portion of the drive mechanism taken along the line 4—4 of FIG. 3.

The drive rod 77 has a cam follower 81 rotatably secured thereto near its lower end and a cam follower 83 rotatably secured thereto near its upper extremity, cam follower 83 being best seen in FIGS. 4, 5 and 12. The lower cam follower 81 is confined for linear, retractable vertical movement along a passageway 85 formed in a stationary cylindrical member 86. This member is axially disposed within the cylindrical shank 67 and is secured thereto by an outwardly projecting flange portion 86a abutting against an undercut shoulder formed in the lower flange portion 67b of the shank. Rotational movement of the member 86 is prevented by one or more fastening members 86b (FIGS. 2 and 7) additionally securing member 86 to the stationary shank 67.

As can be readily seen in FIG. 2, the upper end of the linear passageway 85 formed in the stationary member 86 is positioned so as to be in direct alignment and to communicate with a lower vertical extension 56c of the orbital passageway 56 formed in the barrel cam 55. As such, actuation of the pneumatic cylinder 71, so as to progressively extend the piston 73 thereof to a maximum limit, causes the drive rod 77 to move the lower cam follower 81 progressively upward along the linear passageway 85 from an initial lower starting position, depicted in FIG. 2, to an upper position (not shown) near the upper end of the passageway. Simultaneously, the cam follower 83 moves upwardly along the right half portion 56a of the orbital passageway from the initial position depicted in FIGS. 2 and 5 to the upper vertex of the passageway, depicted in FIG. 12C.

In accordance with the particular contour of the passageway 56 formed in the barrel cam in one preferred illustrative embodiment, movement of the cam follower 83 from the position depicted in FIG. 12A to the intermediate position depicted in FIG. 12B results in the barrel cam 55 being rotated clockwise 45°. Movement of the cam follower 83 from the intermediate position to the upper vertex of the passageway 56 (FIG. 12C) results in the barrel cam 55 being rotated counterclockwise 45° or back to the initial angular position depicted in FIG. 12A.

Upon progressive retraction of the drive rod 77 from within the barrel cam 55, the cam follower 83 moves downwardly along the left half portion 56B of the orbital passageway. Movement of the cam follower 83 from the position depicted in FIG. 12C (upper vertex) to the intermediate position depicted in FIG. 12D results in the barrel cam 55 being rotated counterclockwise 45°. Thus, it is readily seen that the barrel cam is rotationally displaced 90° in being rotated from the angular position depicted in FIG. 12B to the position depicted in FIG. 12D. Continued downward movement of the cam follower 83 from the intermediate position depicted in FIG. 12D to the position depicted in FIG. 12A completes an orbit about the orbital cam passageway 56 and results in the barrel cam 55 being rotated again clockwise 45° back to its initial or neutral angular position. From the position depicted in FIG. 12A, the cam follower 83 moves downwardly until it reaches its lowermost dwell position within the linear passageway section 56c.

Such peculiar multi-directional rotational displacement of the barrel cam 55 is employed to effect very precise rotational displacement of the multi-finger index table 25 in opposite directions successively and with different predetermined degrees of rotation in accordance with the illustrative embodiment. As will become more readily apparent hereinafter, this unique index table movement does not coincide directly with that of the barrel cam becuase of the utilization of an indirect coupling which involves a predetermined amount of loss motion or overtravel therebetween.

Considering the barrel cam again in greater detail, a spring-loaded, pivotal lever 87 (best seen in FIGS. 2, 3, 5 and 7) is rotatably secured at its upper end through a fastener 88 to the support plate 60. A lower, inwardly extending vane-shaped portion 87a of the lever 87 extends through a cutout 60a in the support plate 60 and communicates with the lower vertex of the passageway 56. Each of two springs 89—89, secured at one end to an intermediate section of the lever 87 and at the opposite end to brackets on the support plate 60 (FIG. 3), normally maintains the portion 87a of the lever in the position depicted in FIGS. 2, 5 and 12A. The lever is employed to insure that the cam follower 83, while moving upwardly will be directed into the right half (56a) of the orbital passageway 56. Whenever the cam follower 83 moves downwardly through the lower vertex of the passageway 56, it initially contacts the vane-shaped portion 87a of the lever and thereafter pivots the lever to the right, overcoming the normal spring-bias in the opposite direction applied thereagainst, such that the vane-shaped portion arrives at the position depicted in FIG. 8. After the cam follower 83 moves downwardly past the vane-shaped portion 87a of the lever, the lever is again spring-biased pivotally back to its normal position depicted in FIGS. 2 and 5.

It is very important that the cam follower 83, upon arriving at the upper vertex of the passageway 56, always descends downwardly along the left half portion 56b thereof. To insure that this happens, both a continuous force and a momentary snap-action type of rotational force are imparted to the barrel cam 55 in a counterclockwise direction, the latter force occurring whenever the cam follower 83 passes through the upper vertex of the passageway 56.

Figure 3:
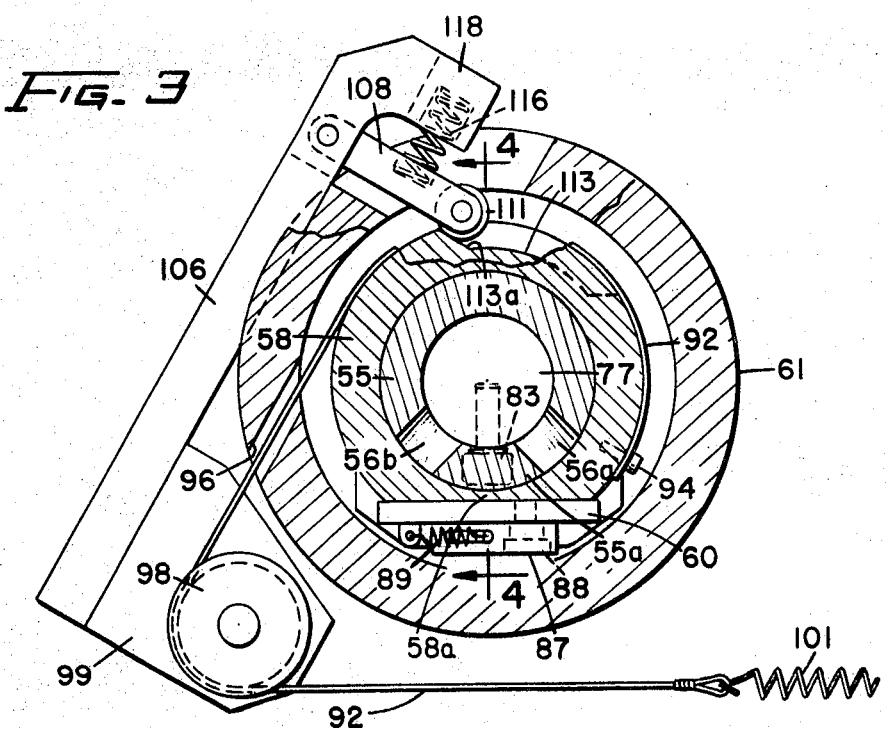
FIG. 3 is a cross-sectional view of the drive mechanism taken along the line 3—3 of FIG. 2, illustrating in greater detail portions of the barrel cam, support structure therefor and spring-biased structural elements associated therewith.

The continuous and snap-action rotational forces are accomplished in accordance with the principles of the present invention by utilizing (as best seen in FIGS. 1 and 3) a combination of a spring-biased band 92, partially wrapped around the rotatable support sleeve 58, and a mechanism comprised of a pivotal arm 106, a spring-biased lever 108 and a cam follower 111. Considered more specifically, the continuous rotational force imparted to the barrel cam 55 is produced by the band 92, preferably made of metal. The band is fastened at one end to the outer wall of and extends approximately 180° around the rotatable support sleeve 58, when in its neutral or dwell position. A slot 96 formed in the outer stationary housing 61 allows the band to pass therethrough and then around a pulley 98 rotatably secured to a bracket 99. The band is continuously placed under spring-biased tension by means of a coil spring 101, secured through a bracket 102 to a leg 103 of the stationary table 22, seen only in FIG. 1.

Considering now in greater detail the aforementioned apparatus (FIG. 3) for imparting a momentary snap-action type of rotation to the barrel cam, it is seen that the arm 106 is applied to the bracket 99 on which the pulley 98 is mounted. One end of the lever 108 is pivotally secured to an upper end region of the arm 106, and supports the cam follower 111 at the opposite end. During the major portions of the initial clockwise and subsequent counterclockwise rotations of 45° each imparted to the barrel cam 55, the cam follower 111 normally rides along the outer surface of the rotatable support sleeve 58.

However, whenever the barrel cam approaches the neutral position moving in a counterclockwise direction, i.e., from the position depicted in FIG. 12B to that depicted in FIG. 12C, so as to position the cam follower at the upper vertex of the passageway 56, the cam follower 111 is spring-biased against a tapered surface 113a of an undercut groove 113 formed in and extending a short distance longitudinally around the rotatable support sleeve 58 (best seen in FIGS. 3 and 4). Each time such cam follower-tapered surface contact occurs, a momentary counterclockwise rotational force is imparted to the barrel cam 55. A coil spring 116, interposed between the lever 108 and a bracket 118 affixed to the upper end of the pivotal arm 106, continuously biases the cam follower 111 in an off-center manner against the support sleeve 58. Opposite ends of the spring are seated within respectively aligned recesses of the lever and bracket.

Thus, it is the spring-biased cam follower 111 and the spring-biased band 92, in combination, that imparts the advantageous supplementary counterclockwise rotational force against the barrel cam 55 whenever the cam follower 83 moves through the upper vertex of the passageway 56 into the left half portion 56b thereof.

During rotation of the barrel cam from the position depicted in FIG. 12C back to the position depicted in FIG. 12A, the cam follower rides along the base of the groove 113 until just before the neutral position is reached. At that point the cam follower 111 is again in contact with the tapered cam surface 113a. However, as the cam follower 83 is forcefully being driven only downwardly at that time into the linear portion 56c of the passageway 56, the small, supplemental counterclockwise rotational forces exerted on the support sleeve by the cam follower 111 and steel band 92 have no effect on the direction of movement of the cam follower 83.

Attention will now be directed more specifically to the unique manner in which the multi-finger index table 25 is indirectly coupled to the barrel cam 55 so as to produce compound rotational and vertical displacement thereof in a sequential manner. As previously noted, the index table 25 may be either secured to or formed as an integral part of the rotatable support member 30. This support member, as best seen in FIGS. 2, 7, 9 and 12, is coaxially positioned on and supported by a rotatable drive shaft 126 so as to be movable not only rotationally but axially relative to the latter.

The drive shaft 126 is secured by any suitable means at its lower end to the upper surface of the rotatable support sleeve 58. A helical spring 131, coaxially positioned about the drive shaft 126, is partially seated at its upper end within a cylindrical groove 133 of the support member 30, with the lower end of the spring being biased against the upper surface of a washer 128. Mounted in this manner, it is readily apparent that any downward force exerted on the index table support member 30 will not only further compress the spring, but result in the table being moved downwardly toward the washer 128, with the maximum possible vertical displacement being when the support member 30 abuts against the washer.

Controlled vertical displacement of the index table 25 (and of the support member 30) while positioned at predetermined angular positions is accomplished through the use of a mutually disposed pair of biasing cam followers 135—135. These cam followers are rotatably secured to opposite ends of a support member 137 (best seen in FIGS. 2, 7, 9 and 12), with the latter being rigidly secured to the upper end of the rotatable drive shaft 126 by any suitable means, such as a threaded fastener 139 (FIG. 2). The helical spring 131 provides the means whereby the cam followers 135—135 are continuously maintained in spring-bias contact with and normally positioned at the vertices of respectively associated V-shaped notches 141—141 formed in the upper edge of the support member 30.

As will become more apparent hereinafter in connection with a description of the manner in which the index table is rotated, vertical displacement of the table is produced whenever the support member 30 is momentarily held stationary while the drive shaft 126 forces the cam followers 135—135, indirectly secured thereto, at least partially out of the V-notches 141 along the tapered surfaces 141a thereof. The particular location of the mutually disposed V-notches 141 is thus seen to be determinative of when the index table 25 is periodically vertically displaced during each operating cycle.

As previously mentioned, in the illustrative application it is desired that the multi-finger index table 25 not only be angularly displaced first in one direction and then in the other, but in successively opposite directions by different degrees of angular displacement, followed by rotation in a direction opposite to the second by an amount so as to arrive back at the initial position. While the orbital passageway 56 in the barrel cam could be initially formed so as to provide the exact degree of rotation desired during each successive indexing period, it becomes readily apparent that it would be quite difficult and expensive to machine such a passageway in a barrel type cam with the accuracy normally required to satisfy precise indexing of the table in demanding manufacturing applications.

Moreover, if the index table were directly coupled to and driven by the barrel cam, with the limits of angular displacement of the table thereby being controlled solely by the particular configuration of the barrel cam passageway itself, it would be necessary to disassemble the entire drive mechanism and incorporate a new barrel cam 55 in the apparatus each time a change in index table rotational and/or vertical displacement was desired. If, on the other hand, a degree of loss motion or overtravel were incorporated in the coupling of the index table to the barrel cam, then only that portion of the apparatus controlling loss motion or overtravel would have to be interchanged in order to alter the degree of angular displacement of the table.

In accordance with the principles of the present invention, a form of loss motion or overtravel is incorporated in the indexing apparatus embodied herein in a simple and readily interchangeable manner. The significance of such loss motion and the manner in which it is accomplished is best seen from a description of the actual angular displacements imparted to the index table relative to the barrel cam 55. For the aforementioned illustrative application of assembling a diaphragm-armature assembly of the type depicted in FIG. 6, it was desired to rotate the index table 30° clockwise, then 60° counterclockwise, then 30° clockwise (see FIG. 10).

To accomplish the initial index table displacement of 30° clockwise, the barrel cam 55, as well as the drive shaft 126 secured thereto, is rotated 45° as a result of the cam follower 83 moving from the position depicted in FIG. 12A to the position depicted in FIG. 12B. As such, 15° of loss motion is required in order to restrict the rotational movement of the index table to 30°. This degree of loss motion is accomplished by forming a longitudinally extending cam slot 145 along a portion of the wall of the index table support member 30 (best seen in FIGS. 9 and 12D). A cam follower 146, which is rotatably secured to a shaft 147, is positioned to communicate with the slot 145. The shaft is supported at one end to a bracket 149 (FIGS. 1, 2 and 7) which, in turn, is secured to the auxiliary support plate 34.

As can be best seen in FIGS. 9A and 9B, upon both the drive shaft 126 and the index table support member 30 being rotated 30°, the cam follower 146 moves into contact with a vertical sidewall 145a of the slot 145 (FIG. 9B). At that point, the support member 30 is prevented from rotating the additional 15° with the drive shaft 126, because the shaft 147 supporting the cam follower 146 is secured to the stationary bracket 149. As a result, the cam followers 135—135 start to ride out of the V-notches 141 formed in the upper edge of the index table support member 30, thereby causing the latter to be vertically displaced. As the index table 25 is formed either as an integral part of or otherwise secured to the support member 30, it likewise is vertically displaced. In the illustrative embodiment, such vertical displacement is three-eighths inch.

Again with reference to FIG. 9B, it is seen that the elongated cam slot 145 formed in the table support member 30 has a somewhat curved cam surface base which merges into rounded corners which, in turn, merge into respectively adjacent vertical sidewalls 145a, 145b. This particular cam slot configuration results in the cam follower 146 contacting the base of the slot only along the end regions thereof. As such, the cam follower 146, in approaching a given lower corner of the slot 145, gently urges the index table support member 30 downwardly just before the cam follower arrives at and contacts the particular sidewall associated with that corner. In this way, the cam follower 146 effectively initiates both the vertical displacement of the index table and the movement of the cam followers 135—135 out of the vertices of the V-notches 141. This occurs immediately before the cam followers 135—135 would otherwise be more abruptly driven from the vertices of the notches by the positive rotation of the directly connected drive shaft 126.

Upon the barrel cam 55 and drive shaft 126 being rotated 90° counterclockwise from the position depicted in FIG. 12B to the position depicted in FIG. 12D, the support member 30 and index table 25 are rotated only 60° counterclockwise, thus, necessitating 30° of loss motion between the barrel cam-drive shaft combination and the support member-index table combination. This degree of loss motion is porduced in the following manner. During the first 15° of counterclockwise rotation of the barrel cam 55 and drive shaft 126, the spring-biased force exerted by the cam followers 135—135 against the then contacting tapered surfaces of the V-notches 141 results in the support member 30 and index table 25 remaining stationary with respect to rotation, but rising vertically to the previous elevation thereof. The period of time during which the initial 15° of loss motion occurs between the barrel cam 55 and the index table 25, and the magnitudes of the relative movements that occur there-between during that period are best illustrated in the timing chart depicted in FIG. 11.

Only after the cam followers 135—135 reach the vertices of the respective V-notches 141 will the support member 30 and index table 25 begin to rotate counterclockwise with the barrel cam 55. When this happens, of course, the relative movement between the support member 30 and the fixed position of the cam follower 146, results in the latter being brought into contact with the left sidewall 145b of the cam slot. It is this relative movement between the cam follower 146 and the support member 30 that encompasses 60° of counterclockwise rotation of the table support member 30 and index table 25. At that time, the cam follower 146 again acts as a positive table stop while the barrel cam 55 and drive shaft 126 continue to rotate the final 15° of the total of 90° of rotation in a counterclockwise direction. This last 15° of rotational movement again causes the cam followers 135—135 to move at least partially out of the V-notches 141 and, thereby, vertically displace the support member 30 and index table 25.

The subsequent and final clockwise rotation of the barrel cam 45° during a given indexing period, from the position depicted in FIG. 12D to the position depicted in FIG. 12A, results in the support member 30 and the index table 25 moving clockwise only 30° before arriving at the original or dwell position. Again, because of the spring-biased force exerted by the cam followers 135—135 against the then contacting cam surfaces of the V-notches 141, the support member 30 and index table 25 do not rotate during the first 15° out of the total of 45° of final clockwise rotational movement of the barrel cam 55 and drive shaft 126 back to the original or dwell position.

It becomes readily apparent, of course, that by simply varying the location and number of V-notches 141 formed in the upper edge of the support member 30, any number of vertical displacements may be imparted to the index table 25. It should also be understood that the notches 141 need not be of V-shaped configuration, but rather, could comprise any one of a number of straight line or curved configurations to satisfy not only the degree of vertical displacement desired, but the speed and duration of such displacement.

Similarly, it should be readily appreciated that the orbital passageway 56 may take any one of a number of other forms. For example, one portion or section thereof need not even be arcuate or otherwise non-linear along its length. More specifically, for certain applications, it may be desirable to have only one portion or section of a continuous, orbital passageway non-linear, with the remainder being linear, such as in the capital letter D. As a matter of fact, the passageway in certain limited applications need not even be orbital, but rather, simply double ended with an arcuate or non-linear section along the length thereof. What is required in accordance with the principles of the present invention is that the passageway 56 have a non-linear or arcuate section so that the rectilinear path of travel of the cam follower 83 will force the barrel cam to rotate to an angular position whereby every point along the passageway will be brought into alignment with the cam follower as it passes therethrough. It thus can be seen that the magnitude of rotational displacement of the barrel cam and the direction thereof, will be dependent upon both the degree of longitudinal displacement and the angle of inclination of the particular passageway at any point therealong relative to the rectilinear path of travel of the cam follower 83, as measured from an arbitrary neutral or dwell position of the barrel cam 55.

For the particular illustrative manufacturing application described herein, each of the index table fingers 25a–25e supports a vacuum pick-up head designated generally by the reference numerals 151a–151e, best seen in FIGS. 2, 7 and 10. Each of these heads is respectively connected by a separate vacuum line 154a–154e to a common cylindrical vacuum line 157 which, in turn, is connected through a supply line 161 to a suitable selectively actuated vacuum pump 163 (shown only symbolically in FIG. 10).

With such vacuum pick-up heads, it is seen that periodic compound rotational and vertical displacement of the index table 25 will allow a particular article to either be placed on the upper surface of a given stationary fixture 32 in alignment therewith, or picked up therefrom for subsequent transfer to the next succeeding stationary fixture.

Figure 6:
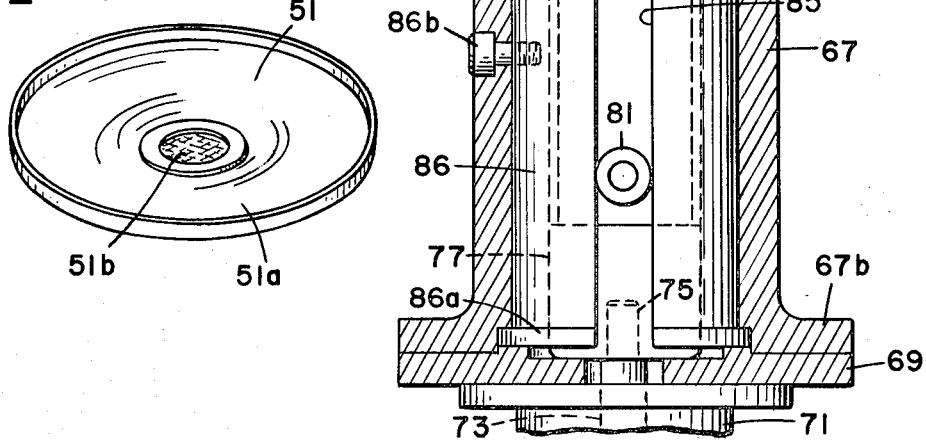
FIG. 6 is a perspective view of a typical diaphragm-armature assembly of a telephone receiver unit, the diaphragm initially being formed out of sheet stock, then formed and perforated, and then an armature fed to and crimped within a central aperture of the diaphragm, these operations all taking place at different work stations associated with the multi-directional indexing apparatus of the present invention.

With the various structural details of the multi-directional indexing apparatus having been described in detail hereinabove, a typical sequence of indexing periods of the apparatus will now be described in connection with the illustrative manufacturing application wherein diaphragm-armature units 51 of the type depicted in FIG. 6 are assembled. To this end, attention will be directed primarily to the plan view of the index table 25 in FIG. 10, the timing chart in FIG. 11, and the series of perspective views of the drive mechanism depicted in FIG. 12.

As the actual operations performed on the parts at the various work stations, the nature of the tooling therefor and the manner by which the tooling is operated are all only incidental to the present invention, reference to the various work station operations will only be in general terms and for the sole purpose of better understanding the unique features and mode of operation of the multi-directional indexing apparatus.

To this end, and by way of preliminary background information of general interest only, the diaphragm 51a is initially formed out of thin sheet stock material, such as aluminum, into a circular, concave configuration having a central aperture in which a circular, preformed armature 51b, such as of 2 percent vanadium permendur, is retained. The assembly of these two parts, as it relates to the use of the present indexing apparatus, involves the following successive operations respectively performed at different work stations: blanking the diaphragm out of sheet stock; drawing or forming the diaphragm into a slightly concave cylindrical configuration; perforating the diaphragm to form a central aperture therein, and finally crimping a preformed armature within the aperture of the diaphragm to form a completely assembled diaphragm-armature unit. These operations, of course, require precise feeding, seating, picking-up and transferring of the parts in a sequential manner during each complete operating cycle.

Considered now more specifically in relation to the mode of operation of the indexing apparatus, during the first dwell period of an initial operating cycle, with the index table fingers 25a–e in a dwell position, as depicted in FIG. 10, an operating head 37 including a punch 37a, depicted only generally in FIG. 1, is brought down into engagement with sheet stock material 165, fed by suitable means (not shown) to and supported on the stationary fixture 132a in alignment with the punch. The punch initially blanks out a diaphragm 51a having the desired outside dimensions.

It will suffice to simply say at this point that retractable vertical movement of the punch 37a, as well as of the other tooling, supported on the vertically retractable plate 39, may be effected in a programmed manner under the control, for example, of the pneumatic cylinder 45 mounted on the support plate or shoe 46 disclosed in FIG. 1. It should be understood, of course, that not only simultaneous but selective control of the vertical movements of the various tooling (as well as of any driving power therefor, when necessary for a particular application), may be accomplished with any one of a number of conventional mechanisms and machining control systems.

In accordance with the particular operating cycle times employed for the illustrative application described herein, the blanking operation is accomplished during the dwell period which encompasses slightly more than 1 second in duration. Immediately after that period of time, the barrel cam 55 is rotated 45° clockwise whereas the index table 25, because of the previously described loss motion or overtravel built into the drive mechanism, rotates only 30° clockwise.

Upon the barrel cam 55 rotating clockwise the first 30° of the total 45° during the initial composite indexing period, the cam followers 135—135, normally positioned within the V-notches 141 in the upper edge of the index table support member 30, are moved at least partially out of the notches because of the overtravel of the drive shaft 126 relative to the index table support member 30 as previously described. This results in a momentary downward vertical displacement of the index table 25 of three-eighths inch which is sufficient to allow each vacuum pick-up head 151 associated with a different index finger to make contact with and pick up an article nested in an aligned stationary work fixture 32.

With particular reference to FIG. 10, the article initially picked up by the vacuum head of index finger 25a, for example, is the previously blanked out diaphragm 51a which, at that point, simply comprises a flat, circular blank. This initial down and up vertical displacement of the index table 25 takes place over a time period of approximately 0.2 of a second, as best seen from the timing graph designated "Index Table Vertical Displacement."

Before such vertical displacement of the index table 25 is completed however, which occurs after 0.4 seconds of a composite indexing period, the barrel cam 55, in response to the upward movement of the cam follower 83, has already started to rotate counterclockwise 90°.

It should be appreciated that while the drive rod 77 is moving either into or out of the barrel cam 55, the latter is likewise continuously moving either clockwise or counterclockwise, and only stops when the drive rod 77 is in the approximately 1 second dwell position depicted in FIGS. 2 and 5. As for the index table 25, the timing graph relating thereto discloses that it remains stationary with respect to rotation not only during the 1 second dwell period, but during each vertical displacement period encompassing 0.2 of a second.

Upon the index table 25 being rotated 60° counterclockwise (in response to the barrel cam 55 rotating 90° counterclockwise), it is seen from an examination of FIG. 10 that the index finger 25a, for example, transports the previously blanked out diaphragm, indicated in phantom on stationary fixture 32a, to an overlying and aligned position with the stationary fixture 32b associated with the work station designated "Form Diaphragm Contour." While in this angular position, the index table 25 is again vertically displaced downwardly three-eighths inch while the vacuum is effectively cut off, such as by an overriding supply of air momentarily applied to the vacuum lines 154 from a conventional source 163, shown only symbolically in FIG. 10. As a result, the blanked out diaphragm carried by the vacuum head 151 associated with index finger 25a is released and nested on the upper surface of the aligned stationary work fixture 132b. The short period of time during which air is supplied to the vacuum heads is best seen by the graph designated "Air Burst (vacuum override)" depicted in FIG. 11.

Immediately upon the index table 25 reaching the maximum downward vertical displacement at this point in time, the barrel cam 55 starts to rotate clockwise 45° and, after an initial 15° of overtravel, again drives the index table 25 with it 30° clockwise to the original or dwell position depicted in FIG. 10. While in the dwell position, which as previously mentioned encompasses slightly more than 1 second in duration, a drawing or forming operation is performed on the previously blanked out diaphragm 51a, which is then seated on stationary fixture 132b. This is accomplished, for example, by the upper surface of fixture 132b either supporting a die insert or having a desired contour to mate with a retractable die 137b, depicted generally in FIG. 1.

During the second composite indexing period, index table 25 is again rotated 30° clockwise and then vertically displaced downwardly so that the vacuum pick-up head 151 associated with the index finger 25b, for example, can pick up the formed diaphragm 51a then seated on the stationary fixture 32b. Thereafter, the index table, as previously described, is raised vertically, rotated 60° counterclockwise and then vertically displaced downwardly so that the diaphragm can be seated on the stationary fixture 32c associated with the third work station. In the illustrative manufacturing application described herein, the third work station actually comprises an idle station with no specific work being performed on the diaphragm.

The third composite indexing period results in the vacuum pick-up head 151 associated with the index finger 25c, for example, being rotated 30° clockwise and then vertically displaced to pick up the aligned diaphragm, then seated on the stationary fixture 32c, and transfer it 60° counterclockwise to and seat it on the stationary fixture 32d associated with the fourth "perforate diaphragm" work station. With the index table then indexed 30° clockwise so as to again be in the dwell position depicted in FIG. 10, a perforating operation is performed on the diaphragm 51a by a punch 37d depicted only generally in FIG. 1.

While in this dwell position, a pre-formed cylindrical armature 51b, shown only in phantom in FIG. 10, is preferably fed in an automated manner along a feed track 171 to a position immediately beneath the vacuum pick-up head 151 associated with the index finger 25d. This may be readily accomplished, for example, through the use of a vibratory armature supply bowl (not shown) in conjunction with the feed track 171. The terminating end of the feed track may, for example, not only be aligned with the vacuum pick-up head, but periodically pivotally raised during each dwell period so as to accurately and reliably position an armature 51b in contacting relationship with the pick-up heads.

Accordingly, during the fourth indexing period under consideration herein, the vacuum pick-up head associated with the index table finger 25d, for example, is rotated 30° clockwise with an armature 51b held thereby and then vertically displaced to pick-up the perforated diaphragm, then seated on the stationary fixture 32d. Both the diaphragm and the armature nested thereon are then transferred 60° counterclockwise to and seated on the stationary fixture 32e associated with the fifth "Crimp Diaphragm" station. Thereafter, the index table is again indexed 30° clockwise back to the dwell position.

During this latter dwell period the pre-formed cylindrical armature 51b is permanently secured to the diaphragm by a crimping operation. This may be readily accomplished by the stationary work fixture 132e having an upper die surface that cooperates with a suitable retractable crimping tool 137e, depicted only generally in FIG. 1. Such tooling may be employed not only to permanently crimp the armature to the diaphragm, but to also provide a desired flange about the outer periphery of the diaphragm.

During the fifth composite indexing period, the same sequence of rotational and vertical displacements of the index table as previously described results in the vacuum pick-up head 151 associated with the index finger 25e, for example, picking up and transferring the completely assembled diaphragm-armature unit 51 counterclockwise 60° to an unload position overlying the discharge chute 167, which position actually constitutes the sixth possible work station. Upon receipt of a momentary overriding air blast from the supply source 163, the assembled unit is released into the chute, with the index table thereafter being rotated again clockwise 30° to the dwell position.

It is thus seen with reference to FIG. 10, that five composite indexing periods, each comprising a multi-directional sequence of clockwise, counterclockwise and clockwise rotational displacements, interspersed with two vertical displacements, comprises a complete operating cycle. More specifically, such a cycle results in a blanked out diaphragm being transferred from a first work station, whereat it is depicted in phantom on stationary fixture 32a, to each of the four other circumferentially spaced work stations respectively associated with stationary work fixtures 32b–e, before being discharged into the chute 167 located at the last or sixth work station associated with the index apparatus. While reference was made hereinabove to the particular compound rotational and vertical movements of only one specific index table finger at a time in describing each of the five successive indexing periods, it should be readily appreciated, of course, that all of the index fingers move simultaneously, as they form an integral part of the index table.

In summary, a unique multi-directional indexing apparatus has been described herein which advantageously produces compound rotational and vertical displacement of an index table in a sequential manner, allows work or machining functions to be performed on piece parts without exerting any force on the table itself, and obviates the need for expensive, bulky and uni-directional gear or cam driven mechanisms employed heretofore. The drive mechanism also affords a simple means, through the principle of loss motion or overtravel, to vary the degree of rotational displacement of the index table in opposite directions. Finally, the spring-biased and cam-controlled manner in which the multi-finger index table is mounted allows for precise and readily adjustable control over the degree of and angular positions at which any number of vertical displacements may be imparted to the index table.

What is claimed is:

1. A multi-directional indexing drive mechanism for use with a rotary indexing table, comprising:
    rotatable drive means including at least one cylindrical member having a continuous orbital cam passageway formed in the wall thereof and oriented generally in the axial direction of said cylindrical member, said cam passageway having a first section which is non-linear along at least a portion of its length, and having a second section which merges at opposite ends with said first section to form a continuous orbital passageway with upper and lower communicating vertices; and
    reciprocal drive means at least partially extending within and movable relative to said cylindrical member of said rotatable drive means, said reciprocal drive means having a rotatable cam follower secured thereto and communicating with said cam passageway, said cam follower during each indexing period being reciprocally movable along said passageway, with movement confined along a rectilinear path so as to rotate at least said cylindrical cam member whenever the cam follower communicates with said non-linear section of said passageway, the particular direction and magnitude of rotation imparted to said cylindrical cam member being dependent upon both the degree of longitudinal displacement and the angle of inclination of said non-linear section of the passageway at any point therealong relative to the rectilinear path of travel of said cam follower, as measured from an arbitrary neutral position of said cylindrical cam member, and wherein said cam follower, in moving through successive complete orbits in said orbital cam passageway, causes said cylindrical cam member to be rotated in opposite directions out of, and back into, its arbitrary neutral position on each orbit in the same predetermined sequence.

2. A multi-directional indexing drive mechanism for use with a rotary index table, comprising:

rotatable drive means including a cylindrical member having a cam passageway formed in the wall thereof, said passageway having a first section which is arcuate along at least a portion of the length thereof, said first portion being oriented generally in the axial direction of said cylindrical member, and a second section merging at opposite ends and at oppositely inclined angles with the corresponding ends of said first section so as to form a continuous orbital passageway with upper and lower communicating vertices, and reciprocal drive means at least partially extending within and movable axially relative to said cylindrical cam member, said reciprocal drive means having a rotatable cam follower secured thereto and communicating with said cam passageway, said cam follower during each indexing period being rectilinearly movable at least from a first position coinciding with the lower vertex of said passageway to a second position coinciding with said upper vertex of said passageway and then back to said first position, said rectilinear movement of said cam follower during each indexing period resulting in at least said cylindrical cam member being rotated at least once in opposite directions, the particular direction and magnitude of rotation imparted to said cylindrical cam member being dependent upon both the degree of longitudinal displacement and the angle of inclination of said orbital passageway at any point therealong relative to the rectilinear path of travel of said cam follower, as measured from an arbitrary neutral position of said cylindrical cam member.

3. A multi-directional indexing drive mechanism in accordance with claim 2 further comprising:

a third linear passageway communicating with said lower vertex of said orbital passageway and defining whenever said cam follower is confined therein a neutral position and a dwell period of said rotatable drive means, and wherein said cylindrical member comprises a barrel cam, wherein said reciprocal drive means includes a cylindrical drive rod, wherein said second section of said passageway includes an arcuate portion, and wherein said cam follower in moving from said lower vertex of said orbital passageway to the upper vertex thereof and then back to the lower vertex results in said barrel cam being rotated at least three times in successively opposite directions.

4. A multi-directional indexing drive mechanism in accordance with claim 2 further comprising:

a spring-biased pivotal lever positioned relative to said orbital cam passageway so as to normally close the lower vertex entrance to one section thereof while said cam follower, secured to said reciprocal drive means, moves upwardly along the other section thereof, said lever being spring-biased to an open position by said cam follower whenever the latter makes contact therewith in moving downwardly along the initially closed section of said passageway.

5. A multi-directional indexing drive mechanism in accordance with claim 2 further comprising:

a spring-biased rotatable index table support member coupled to said rotatable drive means, and vertical displacement means secured to said rotatable drive means and cooperating with said support member to periodically vertically displace the last-mentioned member a predetermined distance upon being rotated to specific angular positions during each indexing period.

6. A multi-directional indexing drive mechanism in accordance with claim 5 further comprising:

stop means coupled to said rotatable support member allowing a predetermined degree of periodic overtravel of said rotatable drive means relative to said support member during each indexing period, said periodic overtravel allowing the rotatable support member to be selectively displaced by different angular degrees of rotation than said rotatable drive means during each indexing period.

7. A multi-directional indexing drive mechanism in accordance with claim 3 further comprising:

a spring-biased rotatable index table support member coupled to said rotatable drive means, vertical displacement means secured to said rotatable drive means and cooperating with said support member to periodically vertically displace the support member a predetermined distance upon being rotated to specific angular positions during each indexing period, and stop means coupled to said rotatable support member allowing a predetermined degree of periodic overtravel of said rotatable drive means relative to said rotatable support member during each indexing period, said periodic overtravel allowing the support member to be selectively stopped at different predetermined angular positions relative to said rotatable drive means, and with the rotation of said support member and the vertical displacement thereof being produced in a sequential manner by said rotatable and reciprocal drive means.

8. A multi-directional indexing drive mechanism in accordance with claim 4 further comprising:

a spring-biased rotatable index table support member coupled to said rotatable drive means, vertical displacement means secured to said rotatable drive means and cooperating with said support member to periodically vertically displace the support member a predetermined distance upon being rotated to specific angular positions during each indexing period, and stop means coupled to said rotatable support member allowing a predetermined degree of periodic overtravel of said rotatable drive means relative to said rotatable support member during each indexing period, said periodic overtravel allowing the support member to be selectively stopped at different predetermined angular positions relative to said rotatable drive means, and with the rotation of said support member and the vertical displacement thereof being produced in a sequential manner.

9. A multi-directional indexing drive mechanism for use with a rotary indexing table, comprising:

rotatable drive means including a barrel cam having a passageway formed therein, said passageway having a first section which is non-linear along at least a portion of the length thereof, the terminating ends of said first section being spaced apart and aligned at least generally in an axial direction of said barrel cam, and said passageway having a second section merging at opposite ends at inclined angles with the corresponding ends of said first section so as to form a continuous orbital passageway with upper and lower communicating vertices in the wall of said barrel cam, said rotatable drive means further including rotatable support means to independently hold the wall portion of said barrel cam defined within said orbital passageway in free-space relationship with respect to the remaining wall area of said barrel cam, and reciprocal drive means including a cylindrical drive rod at least partially extending within and movable relative to said barrel cam, said drive rod having a cam follower rotatably secured thereto and confined within said passageway, said cam follower being movable along a rectilinear path at least between said lower and upper vertices, said cam follower in moving along said rectilinear path thereby forcing said barrel cam to be variably rotationally displaced and in opposite directions, the degree of rotation and the direction thereof being dependent upon both the degree of longitudinal displacement and the angle of inclination of said passageway at any point therealong relative to the rectilinear path of travel of said cam follower, as measured from an arbitrary neutral position of said barrel cam.

10. A multi-directional indexing drive mechanism in accordance with claim 9 further comprising:

a linear passageway communicating with said lower vertex of said orbital passageway and defining whenever said cam follower is confined therein a neutral position and a dwell period of said rotatable drive means;

a spring-biased pivotal lever positioned relative to said orbital cam passageway so as to normally close the lower vertex entrance to one section thereof while said cam follower, secured to said drive means, moves upwardly along the other section thereof, said lever being spring-biased to an open position by said cam follower when the latter makes contact therewith in moving downwardly along the initially closed section of said passageway, and a spring-biased rotatable index table support member coupled to said drive means.

11. A multi-directional indexing drive mechanism in accordance with claim 10 further comprising:

vertical displacement means secured to said rotatable drive means and cooperating with said rotatable support member to periodically vertically displace the last-mentioned member a predetermined distance upon being rotated to specific angular positions during each indexing period, and stop means coupled to said rotatable support member allowing a predetermined degree of periodic overtravel of said rotatable drive means relative to said support member during each indexing period, said periodic overtravel allowing the rotatable support member to be selectively stopped at different predetermined angular positions relative to said rotatable drive means, and with the rotation of said support member and the vertical displacement thereof being produced in a sequential manner by said rotatable and reciprocal drive means.

12. A multi-directional indexing drive mechanism in accordance with claim 11 further comprising:

biasing means associated with said rotatable drive means for imparting a supplemental rotational force thereto each time said cam follower passes through the upper communicating vertex of said orbital passageway in a predetermined direction.

13. A multi-directional indexing apparatus comprising:

a rotary indexing table including a cylindrical support member secured thereto and oriented axially thereof;

rotatable drive means coupled to said table through said support member and including at least one cylindrical cam member having a continuous orbital cam passageway formed in the wall thereof, said cam passageway being oriented generally in the axial direction of said cylindrical cam member and being formed by two merging sections into a continuous orbital passageway with upper and lower communicating vertices, with at least one section of the passageway being non-linear; and reciprocal drive means at least partially extending within and movable relative to said cylindrical cam member of said rotatable drive means, said reciprocal drive means having a rotatable cam follower secured thereto and communicating with said cam passageway, said cam follower during each indexing period being reciprocally movable along said passageway, with movement confined along a rectilinear path so as to rotate at least said cylindrical cam member whenever the cam follower communicates with said non-linear section of said passageway, the particular direction and magnitude of rotation imparted to said cylindrical cam member being dependent upon both the degree of longitudinal displacement and the angle of inclination of said non-linear section of the passageway at any point therealong relative to the rectilinear path of travel of said cam follower, as measured from an arbitrary neutral position of said cylindrical cam member, and wherein said cam follower, in moving through successive complete orbits in said orbital cam passageway, causes said cylindrical cam member to be rotated in opposite directions out of, and back into, its arbitrary neutral position on each orbit in the same predetermined sequence.

14. A multi-directional indexing apparatus comprising:

a rotary indexing table including a cylindrical support member secured thereto and oriented axially thereof;

rotatable drive means coupled to said table through said support member and including a cylindrical barrel cam having a cam passageway formed in the wall thereof, said cam passageway being oriented generally in the axial direction of said barrel cam and being formed by two merging sections into a continuous orbital passageway with upper and lower communicating vertices, with at least one section of the passageway being non-linear, said cylindrical support member of said indexing table being supported on said rotatable drive means and being spring-biased with respect thereto in a direction axially of said support member; and reciprocal drive means including a cylindrical drive rod at least partially extending within and movable relative to said cylindrical barrel cam of said rotatable drive means, said drive rod having a rotatable cam follower secured thereto and communicating with said cam passageway, said cam follower during each indexing period being reciprocally movable along said passageway, with movement confined along a rectilinear path so as to rotate at least said barrel cam whenever the cam follower communicates with said non-linear section of said passageway, the particular direction and magnitude of rotation imparted to said barrel cam being dependent upon both the degree of longitudinal displacement and the angle of inclination of said non-linear section of the passageway at any point therealong relative to the rectilinear path of travel of said cam follower, as measured from an arbitrary neutral position of said barrel cam.

15. A multi-directional indexing apparatus in accordance with claim 14 further comprising:
    a spring-biased pivotal lever positioned relative to said orbital cam passageway so as to normally close the lower vertex entrance to one orbital section thereof while said cam follower, secured to said reciprocal drive means, moves upwardly along the other section thereof, said lever being spring-biased to an open position by said cam follower whenever the latter makes contact therewith in moving downwardly along the initially closed section of said passageway;
    vertical displacement means secured to said rotatable drive menas and cooperating with said index table support member to periodically vertically displace the last-mentioned member and the index table associated therewith a predetermined distance upon being rotated to specific angular positions during each indexing period.

16. A multi-directional indexing apparatus in accordance with claim 15 wherein said index table is formed with a plurality of outwardly extending and circumferentially spaced fingers, each supporting an article carrying fixture, and said indexing apparatus further comprising:
    stop means coupled to said index table support member allowing a predetermined degree of periodic overtravel of said rotatable drive means relative to said support member during each indexing period, said periodic overtravel allowing the support member and the index table associated therewith to be selectively stopped at different predetermined angular positions relative to said rotatable drive means, and with the rotation of said support member and the vertical displacement thereof being produced in a sequential manner by the interrelated movements of said rotatable and reciprocal drive means.

17. A multi-directional indexing apparatus comprising:
    a rotary indexing table including a cylindrical support member secured thereto and extending axially therethrough;
    stationary table support means;
    a cylindrical stationary housing supported by said support table;
    rotatable drive means mounted within said cylindrical housing and extending upwardly at least in part through an oversized aperture in said table support means, said rotatable drive means being coupled to said index table through said associated support member and including a cylindrical barrel cam having a cam passageway formed in the wall thereof, said passageway having a first section which is arcuate along at least a portion of the length thereof, said first portion being oriented generally in the axial direction of said barrel cam, and a second section merging at opposite ends and at oppositely inclined angles with the corresponding ends of said first section so as to form a continuous orbital passageway with upper and lower communicating vertices, and
    reciprocal drive means at least partially extending within and movable axially relative to said barrel cam, said reciprocal drive means having a rotatable cam follower secured thereto and communicating with said cam passageway, said cam follower during each indexing period being rectilinearly movable at least from a first position coinciding with the lower vertex of said passageway to a second position coinciding with said upper vertex of said passageway and then back to said first position, said rectilinear movement of said cam follower during each indexing period resulting in at least said barrel cam being rotated at least once in opposite directions, the particular direction and magnitude of rotation imparted to said barrel cam being dependent upon both the degree of longitudinal displacement and the angle of inclination of said orbital passageway at any point therealong relative to the rectilinear path of travel of said cam follower, as measured from an arbitrary neutral position of said barrel cam.

18. A multi-directional indexing apparatus in accordance with claim 17 further comprising:
    a linear passageway communicating with said lower vertex of said orbital passageway and defining whenever said cam follower is confined therein a neutral position and a dwell period of at least said barrel cam, and
    a spring-biased pivotal lever positioned relative to said orbital cam passageway so as to normally close the lower vertex entrance to one section thereof while said cam follower, secured to said reciprocal drive means, moves upwardly along the other section thereof, said lever being spring-biased to an open position by said cam follower whenever the latter makes contact therewith in moving downwardly along the initially closed section of said passageway.

19. A multi-directional indexing apparatus in in accordance with claim 18 further comprising:
    vertical displacement means secured to said rotatable drive means and cooperating with said cylindrical support member to periodically vertically displace the last-mentioned member and the associated index table a predetermined distance upon being rotated to specific angular positions during each indexing period, and
    stop means coupled to said cylindrical support member allowing a predetermined degree of periodic overtravel of said rotatable drive means relative to said support member and associated index table during each indexing period, said periodic overtravel allowing the support member to be selectively stopped at different predetermined angular positions relative to said rotatable drive means, and with the rotation of said support member and the vertical displacement thereof being produced in a sequential manner by the cooperative movements of said rotatable and reciprocal drive means.

20. A multi-directional indexing apparatus in accordance with claim 18 wherein said index table is formed with a plurality of outwardly extending and circumferentially spaced article carrying fingers, with each finger supporting an article holding fixture, and further comprising:
biasing means associated with said rotatable drive means for imparting a supplemental rotational force thereto in a direction which assists said cam follower in passing through the upper communicating vertex of said orbital passageway.

21. A multi-directional indexing apparatus in accordance with claim 19 wherein said index table is formed with a plurality of outwardly extending and circumferentially spaced fingers, each supporting an article carrying fixture, and said indexing apparatus further comprising:
a plurality of stationary work fixtures supported on said stationary table support means and circumferentially disposed beneath said index table so as to allow respective alignment of said stationary work fixtures with said index table fingers during each indexing period, and wherein the movement of said cam follower from said lower vertex to the upper vertex and back to the lower vertex of said orbital passageway results in said index table fingers being rotated at least from a dwell position, whereat said respective fingers are interposed between different pairs of adjacent stationary work fixtures to a position, upon being rotated in one direction, whereat at least certain of said respective fingers are aligned with different stationary work fixtures, comprising one set thereof, and then, upon said fingers being rotated in the opposite direction, having at least certain of said fingers respectively aligned with different stationary work fixtures, comprising a second set thereof, before said fingers are rotated back to the initial dwell position, said index table being vertically displaced downwardly by said vertical displacement means each time at least certain of the respective index fingers are positioned in alignment with different stationary work fixtures so that said article carrying fixtures may be actuated to selectively deposit articles on and pick up articles from the respectively aligned stationary work fixtures.

22. A multi-directional indexing apparatus in accordance with claim 21 further comprising:
retractable work performing operating heads disposed above said index table and respectively positioned in alignment with at least certain of said stationary work fixtures, said operating heads being actuated in a sequential manner with respect to the rotational and vertical displacements imparted to said index table so as to move downwardly through the spaces defined between adjacent fingers of said indexing table while the latter is in the dwell position.

23. A multi-directional indexing drive mechanism for use with a rotary indexing table, comprising:
rotatable drive means including a cylindrical barrel cam having a cam passageway formed in the wall thereof and oriented generally in the axial direction of said barrel cam, said cam passageway having a first section which is arcuate along at least a portion of the length thereof and having a second section merging at opposite ends with different spaced regions of said first section in such a manner as to form a continuous orbital passageway with upper and lower communicating vertices in said barrel cam; and
reciprocal drive means including a cylindrical drive rod at least partially extending within and movable relative to said cylindrical barrel cam of said rotatable drive means, said cylindrical drive rod having a rotatable cam follower secured thereto and communicating with said cam passageway, said cam follower during each indexing period being reciprocally movable along said passageway, with movement confined along a rectilinear path so as to rotate at least said barrel cam whenever the cam follower communicates with the arcuate first section of said barrel cam, the particular direction and magnitude of rotation imparted to said barrel cam being dependent upon both the degree of longitudinal displacement and the angle of inclination of said arcuate first section of the passageway at any point therealong relative to the rectilinear path of travel of said cam follower, as measured from an arbitrary neutral position of said barrel cam, and wherein said cam follower in moving from said lower vertex of said orbital passageway to the upper vertex thereof and then back to the lower vertex results in said barrel cam being rotated in opposite directions during each indexing period.

* * * * *